United States Patent
Ouyang et al.

(10) Patent No.: US 9,544,343 B2
(45) Date of Patent: Jan. 10, 2017

(54) CONTENT SHARING SYSTEM FOR SMALL-SCREEN DEVICES

(71) Applicant: Cisco Technology, Inc., San Jose, CA (US)

(72) Inventors: Hua Ouyang, Jiangsu (CN); Yi Lu, Jiangsu (CN); Huahua Yin, Jiangsu (CN); Qi Shi, Jiangsu (CN); Yunwei Luo, Jiangsu (CN)

(73) Assignee: Cisco Technology, Inc., San Jose, CA (US)

( * ) Notice: Subject to any disclaimer, the term of this patent is extended or adjusted under 35 U.S.C. 154(b) by 275 days.

(21) Appl. No.: 13/934,968

(22) Filed: Jul. 3, 2013

(65) Prior Publication Data

US 2015/0012843 A1    Jan. 8, 2015

(51) Int. Cl.
| | |
|---|---|
| *G06F 3/048* | (2013.01) |
| *H04L 29/06* | (2006.01) |
| *G06F 3/14* | (2006.01) |
| *H04N 7/15* | (2006.01) |

(52) U.S. Cl.
CPC .......... *H04L 65/403* (2013.01); *G06F 3/1415* (2013.01); *G06F 3/1454* (2013.01); *G06F 3/1462* (2013.01); *H04L 65/1089* (2013.01); *G09G 2320/103* (2013.01); *G09G 2340/145* (2013.01); *G09G 2354/00* (2013.01); *G09G 2356/00* (2013.01); *H04N 7/15* (2013.01)

(58) Field of Classification Search
CPC .......... G06Q 10/10; G06F 3/0481; H04N 7/15
USPC ........................................................ 715/753
See application file for complete search history.

(56) References Cited

U.S. PATENT DOCUMENTS

| | | | | |
|---|---|---|---|---|
| 5,305,435 A | * | 4/1994 | Bronson ............... | G06F 3/0481 715/775 |
| 5,867,154 A | * | 2/1999 | Berstis et al. ................ | 715/788 |
| 6,343,313 B1 | * | 1/2002 | Salesky ................ | G06F 3/1415 709/203 |
| 2003/0156124 A1 | * | 8/2003 | Good ...................... | G06F 17/27 345/620 |
| 2005/0091604 A1 | * | 4/2005 | Davis ............................ | 715/772 |
| 2006/0190837 A1 | * | 8/2006 | Jarczyk ........................ | 715/778 |

(Continued)

OTHER PUBLICATIONS

Wikipedia, "Navigation bar," retrieved on Mar. 2, 2013, from "http://en.wikipedia.org/w/index.php?title=Navigation_bar &oldid=541697228", 2 pages.

*Primary Examiner* — Ajay Bhatia
*Assistant Examiner* — Jian Yu
(74) *Attorney, Agent, or Firm* — Edell, Shapiro & Finnan, LLC

(57) ABSTRACT

Techniques are presented herein to enable a first device participating in a conference session to adapt its displayed content being shared from a second device that has a larger display and can therefore display a larger area of content than the first device is capable of displaying. The first device has a first display and displays a portion of content being displayed on a second display of the second device that is being shared with the first device during an online conference session. The first device detects when a first change has occurred in the content that is outside of the portion displayed on the first display. A graphical element is displayed on the first display, the graphical element indicating that the first change has occurred in the content outside of the portion being displayed on the first device.

17 Claims, 15 Drawing Sheets

(56) References Cited

U.S. PATENT DOCUMENTS

| | | | |
|---|---|---|---|
| 2008/0134033 A1* | 6/2008 | Burns et al. ................. | 715/705 |
| 2008/0313540 A1* | 12/2008 | Dirks et al. ................. | 715/710 |
| 2009/0249247 A1* | 10/2009 | Tseng ................ | H04M 1/72552 |
| | | | 715/808 |
| 2010/0020086 A1* | 1/2010 | Suzuki ......................... | 345/502 |
| 2013/0019186 A1* | 1/2013 | Lance et al. ................. | 715/753 |
| 2013/0047072 A1* | 2/2013 | Bailor ......................... | 715/234 |
| 2013/0169556 A1* | 7/2013 | Kim ................... | G06F 3/04883 |
| | | | 345/173 |
| 2014/0040768 A1* | 2/2014 | Lazaridis ............. | G06F 3/0483 |
| | | | 715/752 |

\* cited by examiner

CONTENT SHARING SYSTEM FOR SMALL-SCREEN DEVICES

TECHNICAL FIELD

The present disclosure relates to the field of sharing displayed content, such as in a web-based conference session or meeting.

BACKGROUND

Certain conference applications seek to offer "in-person" meeting experiences over a network. These applications allow users to log in to enter a virtual meeting where audiovisual, desktop, and other multimedia information can be shared. Virtual meetings and conferences have an appeal because they can be held without the associated travel inconveniences and costs. In addition, virtual meetings can provide a sense of community to participants who are dispersed geographically.

One feature certain conference applications utilize is the ability to share desktop or application content displayed on one user device with numerous other user devices. With this feature, one user device transmits an image of its displayed content to a plurality of end users, which can view the content and any changes being made thereon.

Increasingly, mobile phones and other small-screen devices are being utilized to participate in these virtual meetings. A problem arises when viewing content presented on a relatively large display of one user in a conference session which is being dynamically updated for display on a small-screen device of another user in a conference session. The user of the small-screen device may only be able to see a portion of the content displayed on the larger display. If changes were made to the content outside of the viewing area of the small-screen device, the user of the small-screen device may fail to notice the changes.

DESCRIPTION OF EXAMPLE EMBODIMENTS

Overview

Techniques are presented herein to enable a first device participating in a conference session to adapt its displayed content being shared from a second device that has a larger display and can therefore display a larger area of content than the first device is capable of displaying. The first device has a first display and displays a portion of content being displayed on a second display of the second device that is being shared with the first device during an online conference session. The first device detects when a first change has occurred in the content that is outside of the portion displayed on the first display. In response to detecting that the first change has occurred in the content that is outside of the portion displayed on the first display, a graphical element is displayed on the first display, the graphical element indicating that the first change has occurred in the content outside of the portion being displayed on the first device. The graphical element is displayed at a location on the first display that is proximate to a location of the first change in the content being displayed on the second display.

Example Embodiments

Figure 1:
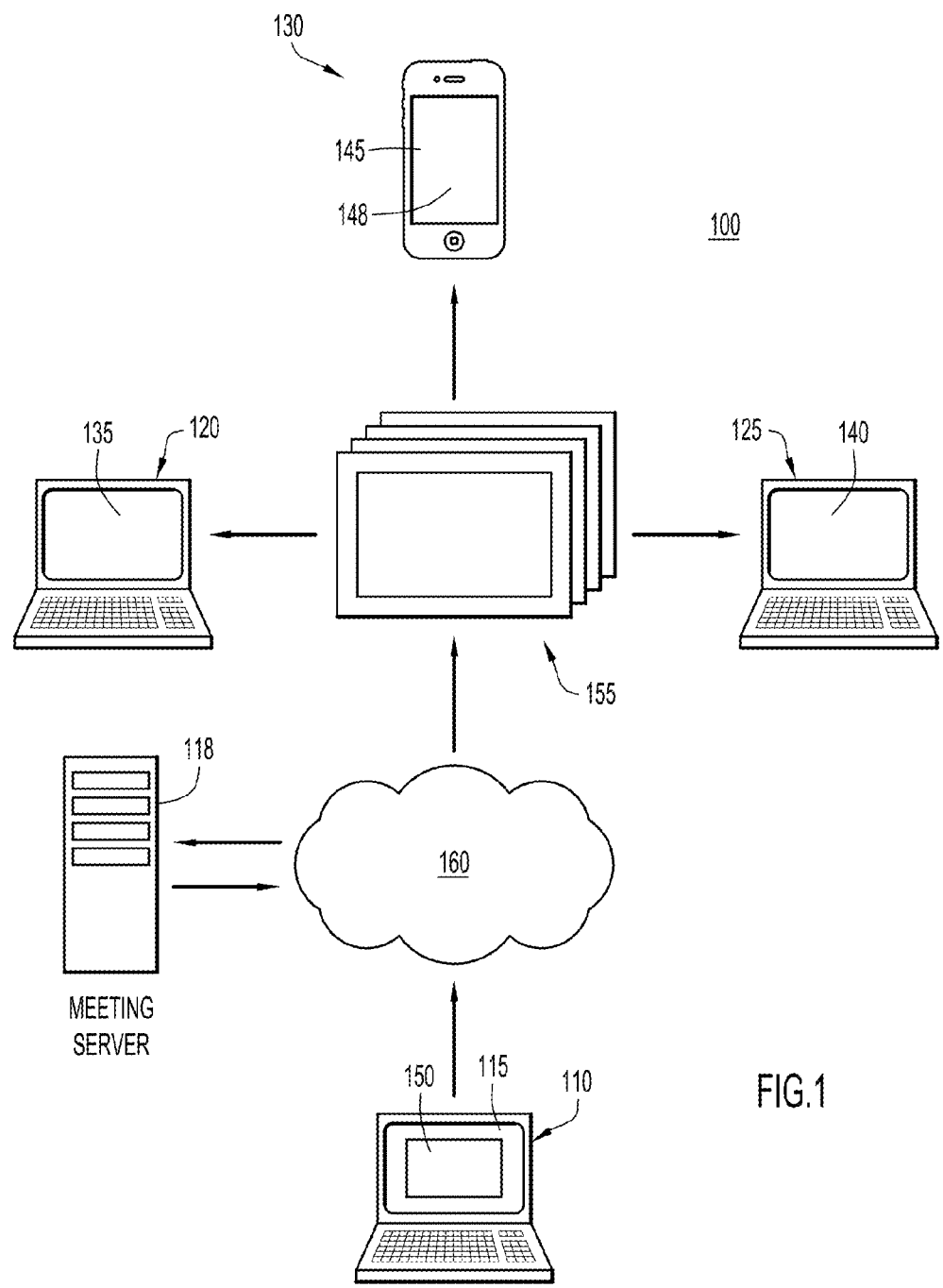
FIG. 1 is a diagram showing an online conference system in which small-screen devices may adaptively display content shared by a larger-screen device according to the techniques presented herein.

Referring first to FIG. 1, a web-based or online meeting/conference system 100 is shown. The system 100 includes a meeting server 118 and a plurality of user devices 110, 120, 125, 130 that communicate with the meeting server 118 and thus with each other, via the meeting server 118, over a network 160. The user devices may be in any number and may take a variety of forms, including a desktop computer, laptop computer, mobile/cellular phone (e.g., Smartphone), tablet computer, etc. The network 160 may consist of one or more wired and/or wireless local and/or wide area networks. FIG. 1 shows that the user device 110 is a laptop computer, by way of example, though the user device 110 could take any of the device forms listed above. In the example shown in FIG. 1, the user device 110 is presenting content (that is also displayed on its display 115) to (i.e., sharing content with) participants/users and user devices 120, 125 and 130. Thus, user device 110 may also be referred to as a presenter device. In FIG. 1, the presenter device 110 shares content 150 displayed on its display 115, with one or more of the user devices 120, 125 and 130. To this end, the content 150 is transmitted across network 160 to the meeting server 118, which duplicates the shared content 150 and then transmits it to the devices 120, 125 and 130. The duplicated content is shown at reference numeral 155. Device 120 has a display 135, device 125 has a display 140 and device 130 has a display 145. The user devices 120, 125 and 130 display duplicated content 155 on their own displays 135, 140 and 145, respectively. For example, device 130 with display 145 would display content 148, which is in most circumstances, is a portion of the shared content 150 because the display 145 is much smaller than the display 115 at the presenter device 110. For these reasons, display content 148 is also referred to herein as display content portion 148.

The content 150 which is shared may include presentation slides or pages of a document, as well as multimedia content, such as text, images, video, sounds, etc. The shared content 150 may further include the entire "desktop" being displayed on display 115, or a portion thereof, or content displayed for an application or process or a video stream information from the presenter device 110. User devices 120, 125 and 130 may also alter the shared content 150 via their own displays 135, 140, 145, or presenter device 110 may have exclusive control over the shared content 150. User devices 120, 125, and 130 may also be able to return audio information or other multimedia content, which is then shared with other devices in the online meeting/conference system 100.

Figure 2:
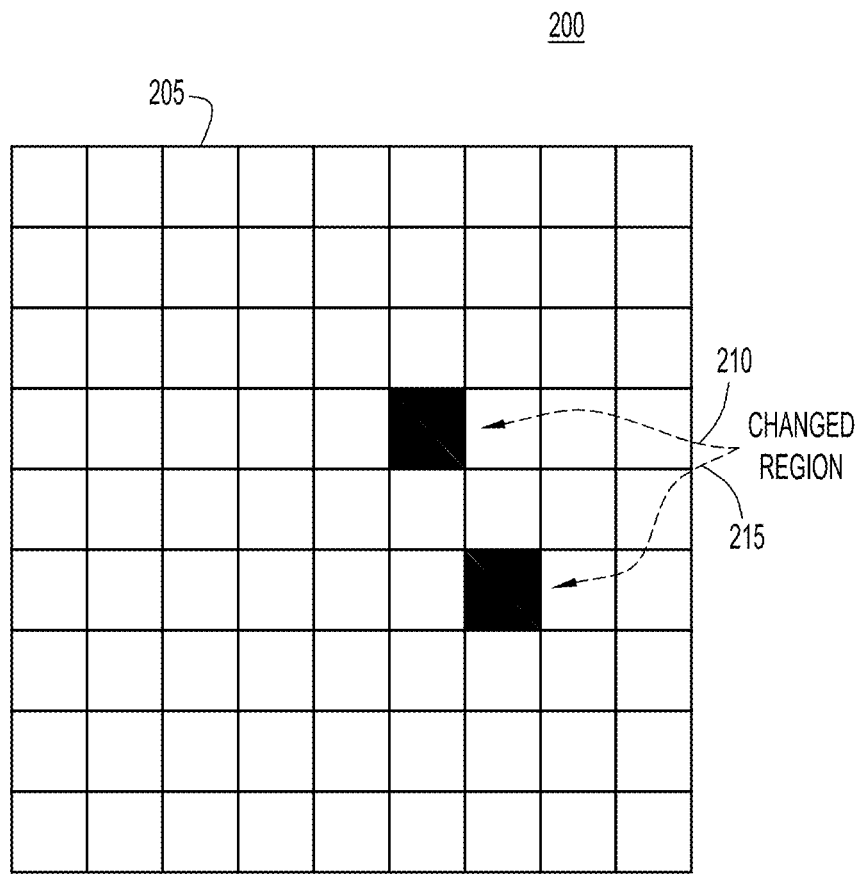
FIG. 2 is a diagram illustrating a technique for detection of changed points in shared content, concepts of which are employed in the adaptive display techniques presented herein.

Turning now to FIG. 2 (with continued reference to FIG. 1), a diagram is provided that illustrates changed regions in shared content of presenter device 110, for example. FIG. 2 shows a display screen 200 representing content to be shared and includes a grid 205 superimposed thereon for explanatory purposes. Rather than continuously sending data for the entire display screen 200 across network 160, typically the meeting server 118 would send data to the participant user devices (e.g., devices 120, 125 and 130) for only the portion of display screen 200 which has actually been altered. In this manner, the amount of data needed to be transmitted across the network 160 is minimized. Changed regions 205 and 215 are portions of the display screen 200 which have been altered, and thus data representing these particular portions of the display screen 200 would be transmitted by the meeting server 118 to the devices 120, 125 and 130 so that the devices 120, 125 and 130 can update the content that each device displays.

Figure 3:
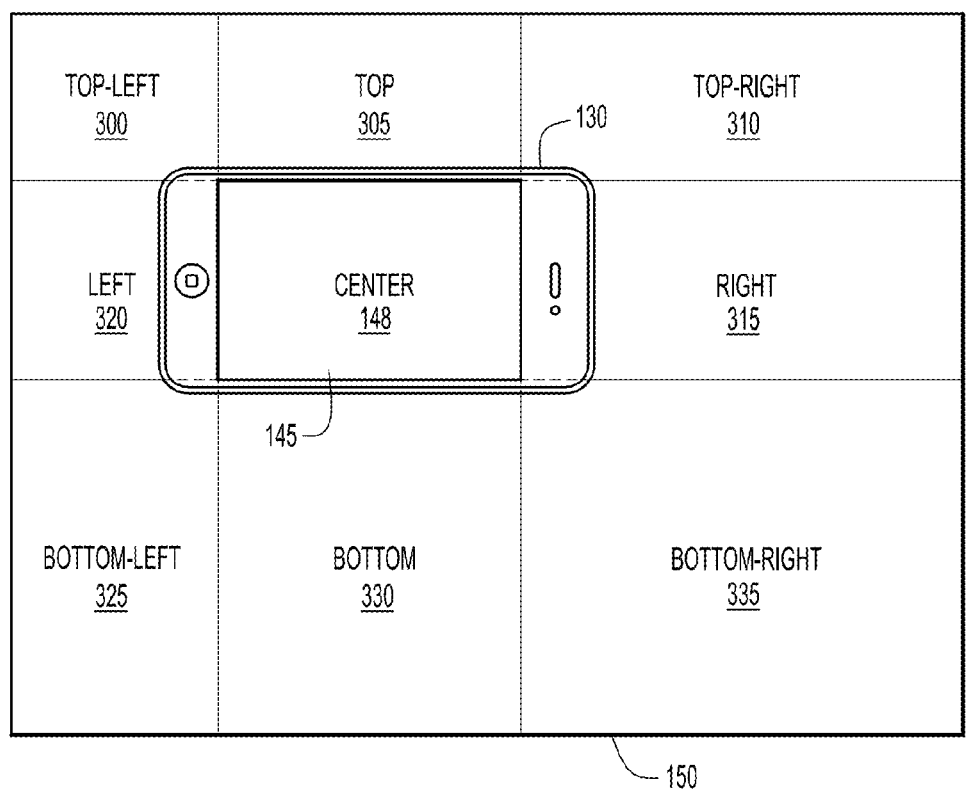
FIG. 3 is a diagram depicting a first display of a first user device that is displaying a portion of content being shared from and displayed on a second display of a second user device according to the techniques presented herein.

Certain user devices, such as user device 130, have displays that are smaller than the displays of presenter device 110 and therefore, such user devices may not be able to display all of the shared content 150 that is being displayed and shared from a larger display, e.g., display 115 of presenter device 110. FIG. 3 illustrates this problem, wherein device 130 with display 145 can display only a portion 148 of the shared content 150. In other words, FIG. 3 shows the display 145 overlaid or superimposed on the entirety of the shared content 150, and as can be seen in the figure, display 145 can only display portion 148 of the shared content 150. The sections of the shared content 150 that are not displayed on display 145 include those regions identified by reference numerals 300, 305, 310, 315, 320, 325, 330 and 335.

Figure 4:
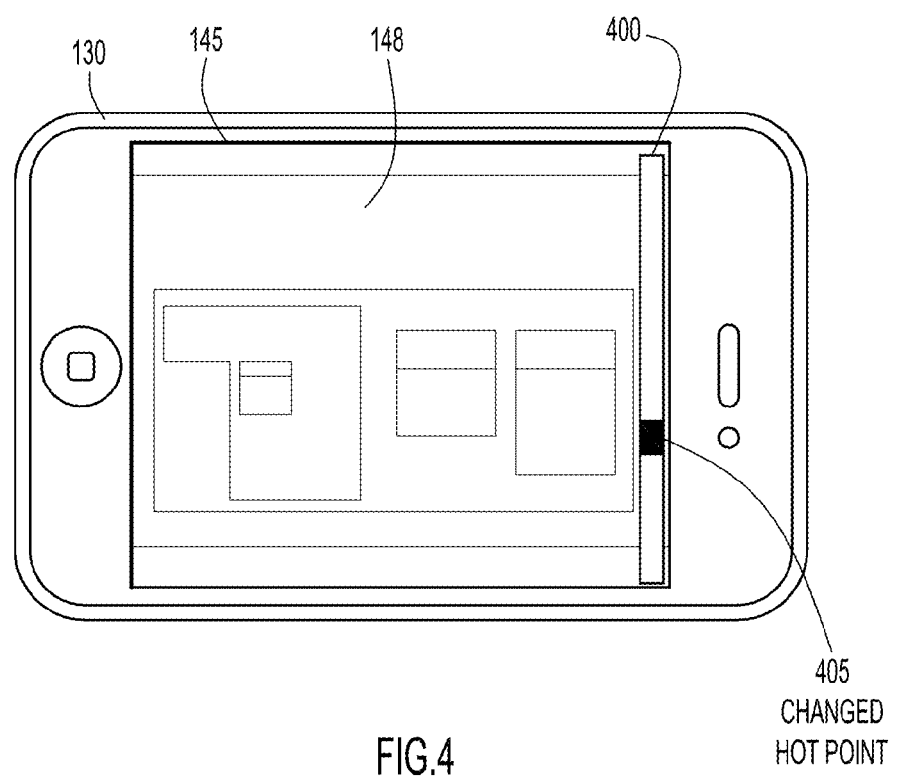
FIG. 4 is a diagram showing one example of a graphical element displayed on the first display indicating a change in content being displayed on the second display.

Turning now to FIG. 4, techniques are introduced in which a device with a smaller device may dynamically update the content it displays according to changes that are occurring in the shared content. The user device 130, with display 145, is again shown, which is currently displaying a portion 148 of shared content 150. A graphical element 400 may be shown on display 145 to provide an indication that a change has occurred in the shared content 150 outside of the portion 148 of the shared content currently being displayed on the display 145 of device 130. The graphical element 400 may take the form of a changed region notification, also known as a notification bar, which includes a changed point indicator 405. The graphical element 400 may have a rectangular shape, in one example, but this is not meant to be limiting. The changed point indicator 405 may be referred to as a "changed hot point." Variations in the appearance of the graphical element 400 would be within the scope of this disclosure. The graphical element 400 may be displayed on the side (edge or border) of the portion 148 being displayed on display 145 that is closest/most proximate to the change in the original shared content 150. The graphical element may thus comprise displaying a first bar along a border of the portion of the content displayed on the first display, and at least one changed point indicator at a location in the first bar that is proximate to a location of the first change in the second display.

Figure 5:
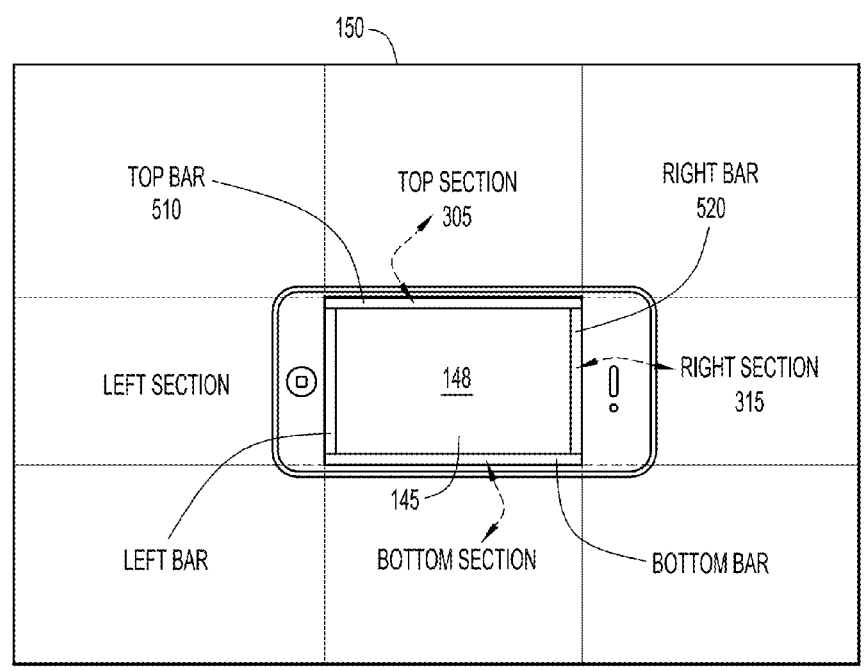
FIG. 5 is a diagram showing another example of display change notifications in the form of multiple changed region notifications.

Referring now to FIG. 5, several graphical elements (e.g., notification bars) are shown that may be simultaneously displayed to indicate corresponding changes in different regions outside of the portion of the content currently being displayed. There is a top notification bar 510 that is displayed when a change has occurred in top region 305. Similarly, side notification bar 520 may appear when a change has occurred in right region 315. Thus, the appearance of the notification bar is an indicator to the end user of the location of any changes outside of the portion 148 currently being displayed.

Figure 6:
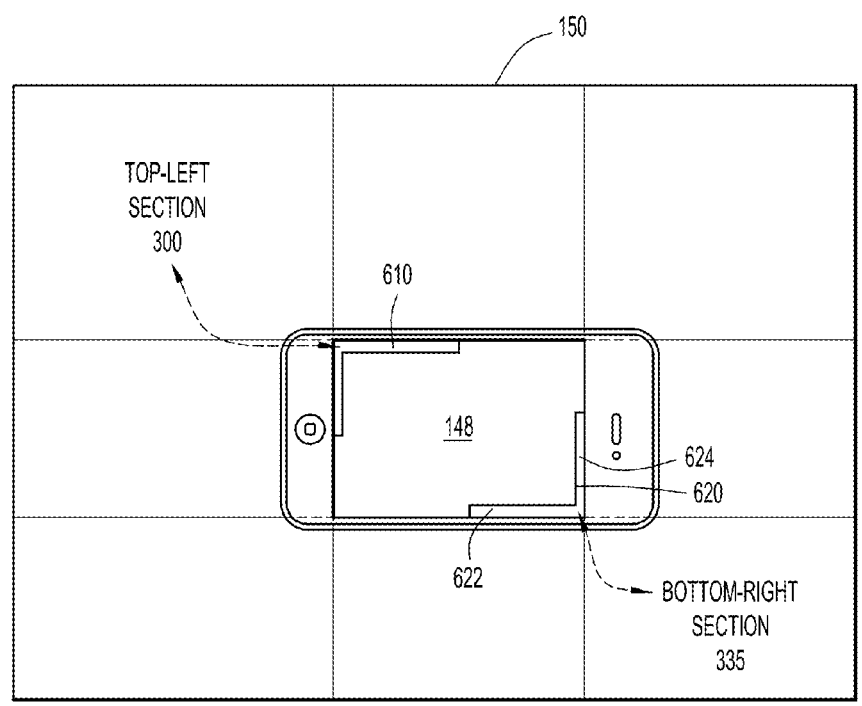
FIG. 6 is a diagram showing an example of changed region notifications when a change in content occurs outside of a corner region of the content displayed on the first device.

FIG. 6 shows how the graphical element may be altered in the event of a change occurring outside of currently displayed portion 148, but in a corner region such as the top-left region 300 or bottom-right region 335. A corner notification bar 610 may wrap around the top-left corner of the displayed portion 148, to provide an indication of a change in the top-left region at 300 outside of the displayed portion 148, and so on for the other corner regions. Similarly, a corner notification bar 620 may wrap around the bottom-right corner of the displayed portion 148 to indicate a change in the bottom-right region 335 outside of the displayed portion 148.

In one embodiment, each side or leg of the corner notification bars 610 and 620 is half the length of the corresponding sides. For example, the corner notification bar 620 has a leg 622 that may be half the length of the bottom of displayed portion 148 and a leg 624 that is half the height of the vertical right side of displayed portion 148. This configuration would occur for all corner notification bars.

Figure 7A:
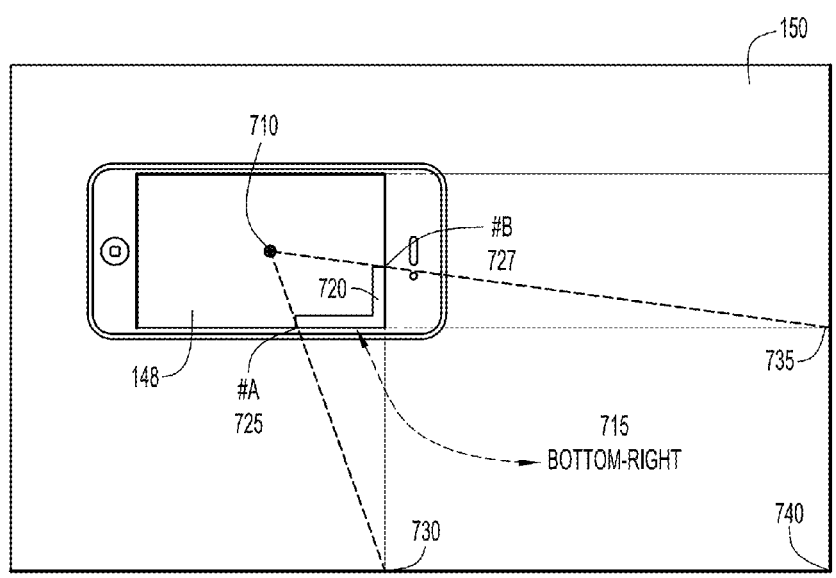
FIGS. 7A and 7B are diagrams showing an example of how changed region notifications for corner regions may be computed according to the techniques presented herein.
Figure 7B:
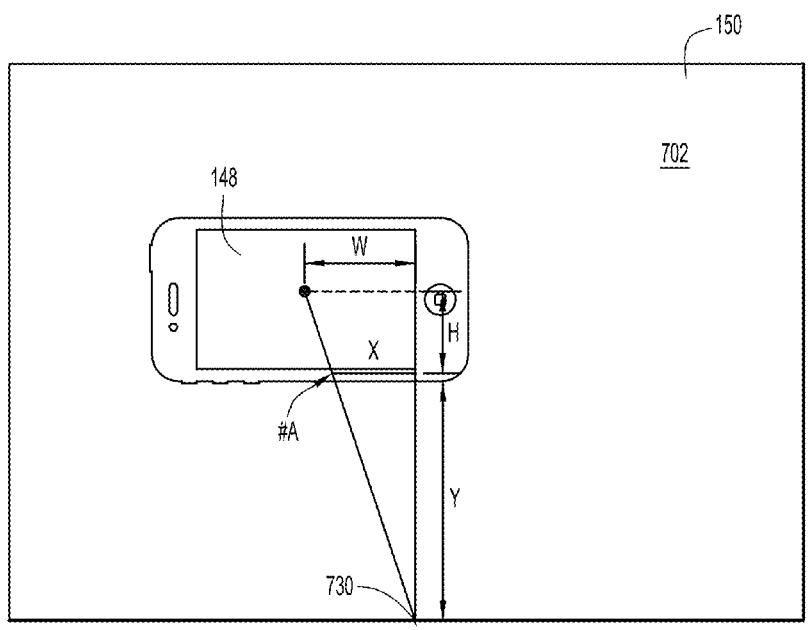

The size of a corner notification bar may be adapted according to a location of the change occurring outside of the currently displayed portion. Reference is now made to FIGS. 7A and 7B. Again, in these figures, the currently displayed portion of the shared content is shown at reference numeral 148. When a change occurs in the bottom-right region 715, a corner notification bar 720 is generated and displayed, and the corner notification bar is sized according to the location of a center point 710 of the current displayed portion 148 and the edge intersection points 730, 735 of the content 150 being shared. The center point 710 and edge intersection point 730 are aligned to determine the notification bar length point 725. Similarly, the upper portion of the corner notification bar 720 is sized according to the location of the center point 710 and the edge intersection point 735 in the same manner. The center point 710 and edge intersection point 735 are aligned to determine the notification bar length point 727. The result of this feature is that, for example, lower-right corner notification bar 720 will shrink in size as the currently displayed portion 148 approaches the lower-right corner 740 of the shared content 150. Such behavior can be similarly repeated for all possible corner notification.

The calculation of the notification bar length points shown at 725 and 727 follows a mathematical formula best illustrated by FIG. 7B. The formula used is X=(Y*W)/(Y+H), where X represents the length of the corner notification bar 720 on the bottom of display portion 148. The figure depicts variables relevant to the corner notification bar 720 shown in FIG. 7A. The variable W represents half the width of the display portion 148, variable H represents half the height, and variable Y represents the distance between the edge intersection point 730 and the bottom of the display portion 148. Finally, variable #A represents the notification bar length point. The formula can be similarly used to calculate the sizes of all corner notification.

Figure 8:
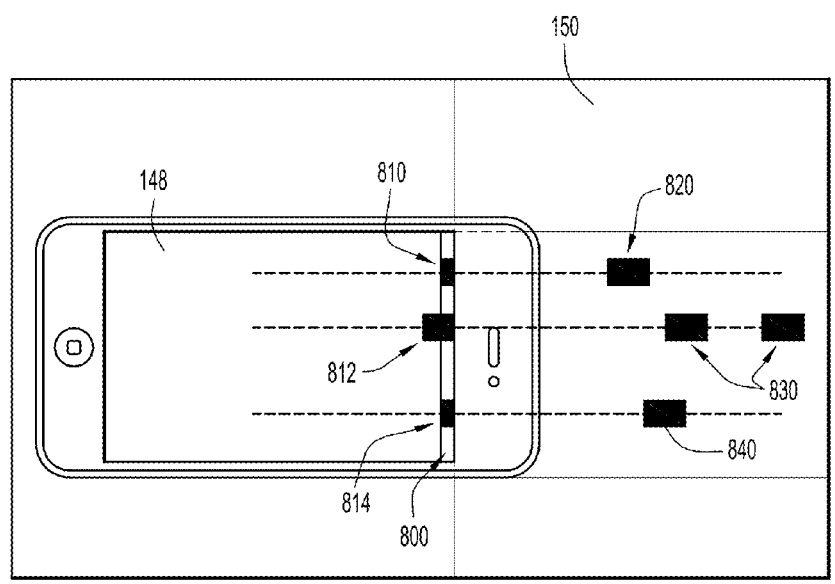
FIG. 8 is a diagram illustrating another example multiple notifications for changes in different parts of the same region of displayed content on the second device.

As discussed above, changed point indicators may also be displayed on or near the change notification bars. Turning now to FIG. 8, an example is shown in which a notification bar 800 displayed on the right edge of displayed content portion 148, and several changed point indicators 810, 812 and 814 are displayed on the notification bar 800 in the event of a change to shared content 150 outside of the displayed content portion 148. For example, in the event the shared content 150 has a change at a point 820 (outside the displayed content portion 148), changed point indicator 810 displayed on the display on the notification bar 800 at location along the length of the notification bar 800 in alignment (vertically as shown in FIG. 8) to the vertical location of the changed point 820, such as at a point lateral to the changed point 820. In the event that there are multiple changes to the shared content 150 in substantially the same location, such as shown in points 830, the changed point indicator 812 may be augmented to be larger, or otherwise altered as shown so that it stands out from other changed point indicators, such as changed point indicator 810 (for changed point 820) and changed point indicator 814 (for changed point 840).

The location of the changed point indicators 810, 812 and 814 may also track with the changes in the displayed content portion 148, such that, as the displayed content portion 148 is moved relative to the shared content 150, the changed point indicators 810, 812 and 814 move along the notification bar 800 to remain in a location corresponding to the locations of the associate changed points, such as at points lateral to the changed points 820, 830 and 840. Also, for example, if the displayed content portion 148 were to be shifted such that it were positioned underneath changed points 820, 830 and 840, the notification bar 800 may be moved and re-displayed on top of displayed content portion 148. The changed point indicators 810, 812 and 814 would be also moved accordingly.

The changed point indicators 810, 812, 814 and notification bar 800 may be displayed substantially immediately upon the detection of a change in shared content 150. The duration that these graphical elements are displayed may have a default time period, which may be configurable by a user. For example, a default time period for the display of changed point indicators 810, 812 and 814 and notification bar 800 may be five seconds. If a first change 820 in shared content 150 were detected, notification bar 800 and changed point indicator 810 would appear on the edge of displayed content portion 148. After five seconds, both the notification bar 800 and changed point indicator 810 would disappear. If instead, however, after three seconds another change 830 was detected, changed point indicator 812 would appear on notification bar 800 along with changed point indicator 810. After two seconds, changed point indicator 810 would disappear, since it will have displayed for five seconds. The notification bar 800 will remain displayed, however, since its time period was refreshed with the addition of changed point indicator 812. An aspect of the invention may thus remove from the first display, after a predetermined period of time has passed, the changed point indicator and the bar.

If the user were to pan over to the region containing the changes, such that changes 820, 830 and 840 were displayed on displayed content portion 148, the notification bar 800 and changed point indicators thereon may disappear, regardless of how much time remained on their time periods. The method may thus comprise removing the changed point indicator and first bar (notification bar) when displaying, on the first device, content being displayed on the second device that contains the change indicated by the changed point indicator.

The displayed content portion 148 is already shown with a plurality of changed point indicators 810, 812 and 814 on notification bar 800. If a large number of changed point indicators were displayed simultaneously, the display could become cluttered and confusing. Thus, beyond a threshold number of changed point indicators, the displayed content portion 148 may simply show a highlighted notification bar 800 without any changed point indicators. The threshold number of changed point indicators may have a default number, and may be configurable by the user. The appearance of the highlighted notification bar 800, such as color, size and shape, may be according to a default setting, but may also be configurable by a user.

Figure 9A:
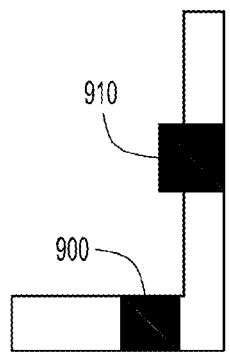
FIGS. 9A, 9B and 9C are diagrams depicting multiple notifications for changes in different parts of the same region of displayed content on the second device.
Figure 9B:
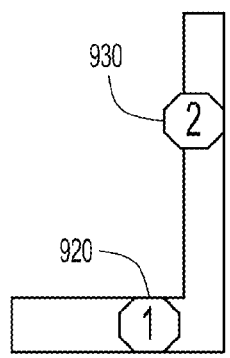
Figure 9C:
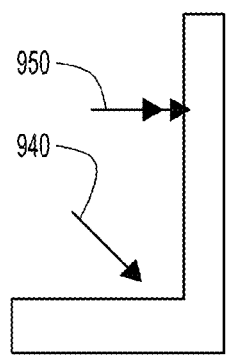

FIGS. 9A, 9B and 9C show examples as to how the changed point indicator may be altered or augmented in the event of one or a plurality of changes. The changed point indicators may be shown as shapes, alphanumeric characters, or arrows, etc. For example, FIG. 9A shows changed point indicators 900 and 910 having different sizes to distinguish one change from another, where the larger changed point indicator 910 may indicate two or more associated changed regions. FIG. 9B shows changed point indicators 920 and 930 that each contain a numeral therein to indicate how many changed regions there are associated with that changed point indicator. FIG. 9C illustrates changed point indicators in the form of different numbers of arrows, as shown at 940 and 950. One instance of an arrow at 940 indicates a single changed region and two instances of an arrow at 950 indicates two changed regions, etc. Other representations of changed point indicators, including variations and combinations of the included examples, would be within the scope of the invention. An aspect of an embodiment of the invention thus comprises detecting a first and second change in the content being displayed on a second display outside of the portion displayed on the first display. The aspect then detects whether the second change is in substantially the same location as the first change; and modifies, in response to detecting that the second change is in substantially the same location as the first change, the changed point indicator in a manner selected from a group consisting of: a shape or color of the changed indicator, an alphanumeric character of the changed point indicator, a number of pointers of the changed point indicator.

Figure 10:
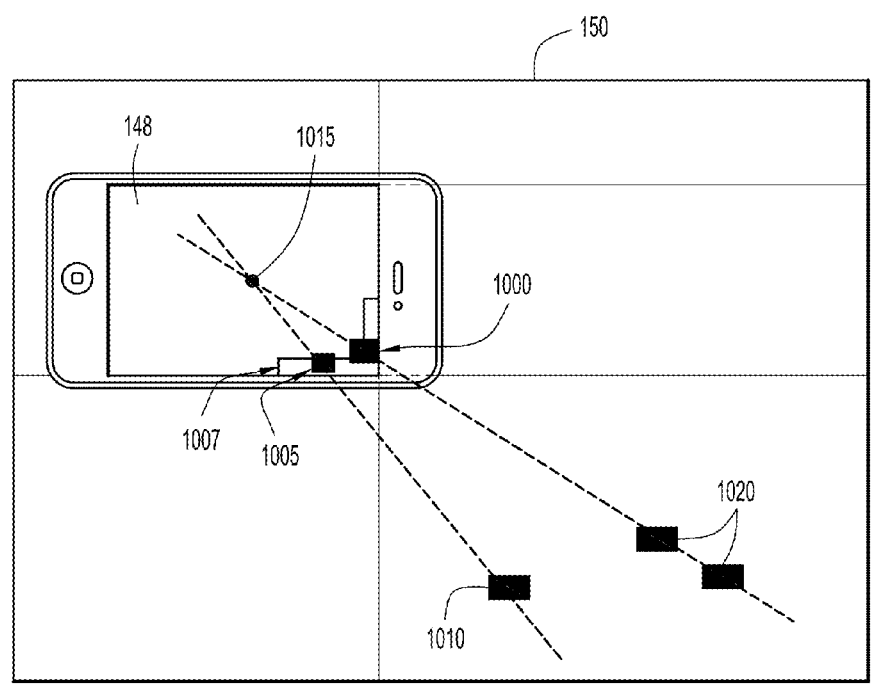
FIG. 10 is a diagram showing still further examples of placement of changed point indicators.

Referring now to FIG. 10, a diagram is shown depicting the placement of changed point indicators 1000 and 1005 on a corner-shaped notification bar 1007 in the event of a change to shared content 150 in a corner region outside of display content portion 148. For example, a change at location 1010 in the shared content 150 would result in a changed point indicator 1005 being displayed aligned with the change 1010 and a center point 1015 of display content portion 148. A changed point indicator, e.g., changed point indicator 1000, may also be augmented in the event of multiple changes as shown at reference numeral 1020 in substantially the same location or alignment with respect to the center point 1015, similar to the functionality described above in regards to FIG. 8 and FIG. 9. Each side of a corner-shaped notification bar 1007 could be called a first bar and a second bar. The graphical element may thus comprise displaying a second bar at a corner of intersecting borders of the portion of the content displayed on the first display, such that the first bar and the second bar are displayed on each intersecting border, and the changed point indicator at a location in either the first bar or the second bar that is proximate to a location of the first change in a corner region of the second display. Further, displaying the changed point indicator may thus comprise determining a center point of a first display, determining an alignment point on the bar that is linearly aligned with the location of the first change in the content being displayed on a second display and the center point of the first display, and displaying the changed point indicator on the alignment point.

The location of the changed point indicators 1015, 1020 may also track with the display 1001, such that, as the display 1001 is moved relative to the shared content 150, the changed point indicators 1015, 1020 move along the notification bar 1040 to remain in a proximate location to the change, such as at locations aligned with the change 1025 and the center point 1010.

Figure 11:
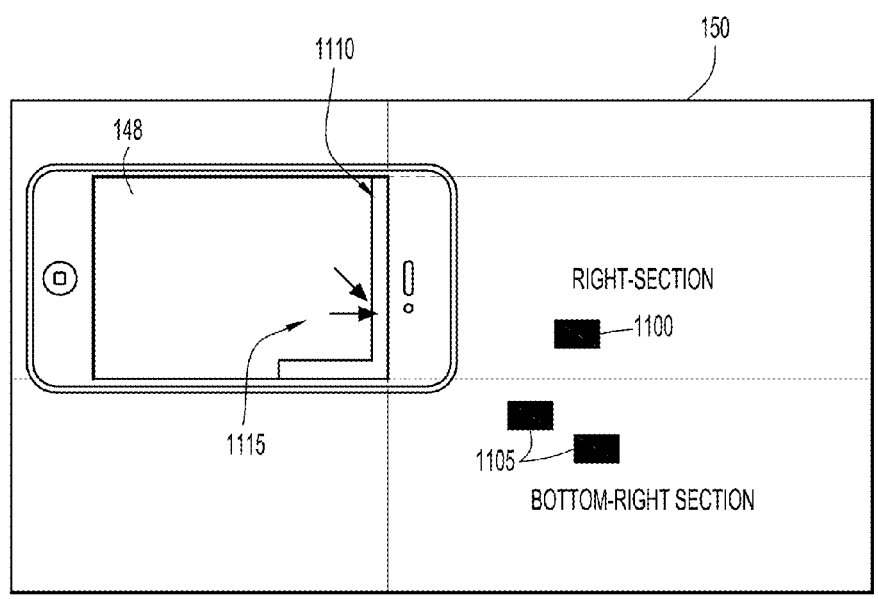
FIG. 11 is a diagram showing examples of changed point indicators for multiple regions.

Turning to FIG. 11, the situation may arise where changes occur in shared content 150 both directly adjacent to an edge of displayed content portion 148, as shown at reference numeral 1100, and in a corner region such as at reference numeral 1105. In this case, multiple notification bars may be displayed such as notification bar 1110, which is a combined corner notification bar and direct notification bar. In this situation it may be advantageous to use arrows as changed point indicators 1115, as they clearly indicate that there has been a change both in the right section at changed location 1100 and bottom-right section at changed location 1105.

Figure 12:
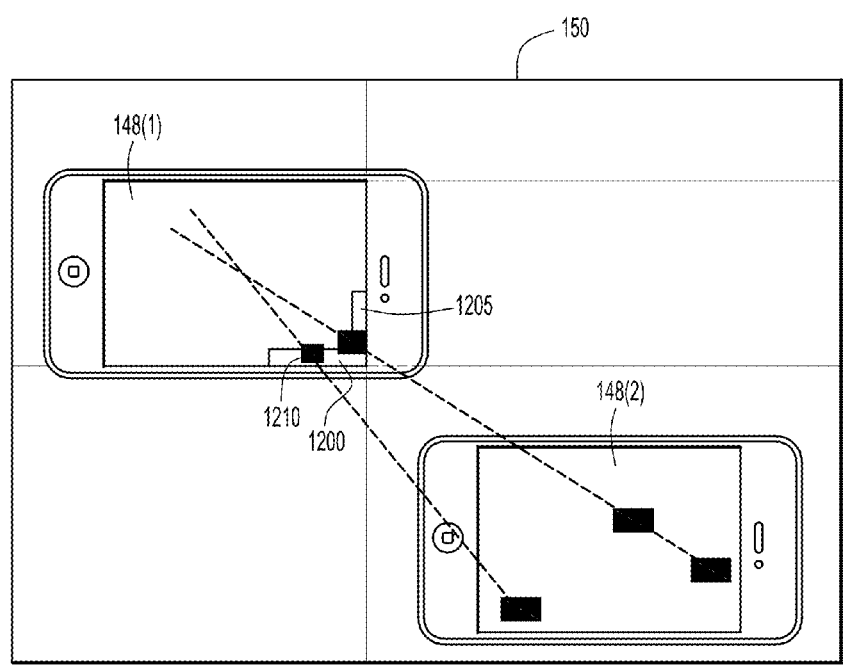
FIG. 12 is a diagram an example of how a user may select a changed point indicator on the first user device in order to adaptively change the content being displayed on the first device to include the region where the change has occurred.

Turning now to FIG. 12, an embodiment including panning functionality is shown when a changed point indicator is selected. At reference numeral 148(1), there is shown displayed content portion 148 that is a subset of the shared content 150. In displayed content portion 148(1), there is displayed a notification bar 1200 and changed point indicators 1205 and 1210. To expedite relocating the display to where changes have occurred in shared content 150, the device detects a selection of a changed point indicator 1210, for example. The selection may come from a user, or the selection may be automatic. Upon detecting a selection, the device automatically updates/pans to display new displayed content portion 148(2), which contains the changes in the shared content 150 that were indicated by the changed point indicator 1210. In other words, the panning/display updating functionality detects which changed point indicator 1210 has been selected, and pans/updates the displayed content portion to include the corresponding portion of the shared content 148(2). All changed point indicators corresponding to the changes now displayed in displayed content portion 148(2) may disappear, as described above. The method may thus further comprise detecting user selection of the changed point indicator; and displaying, in response to detecting user selection of the changed point indicator, on the first device content being displayed on the second device that contains the first change indicated by the changed point indicator.

Figure 13:
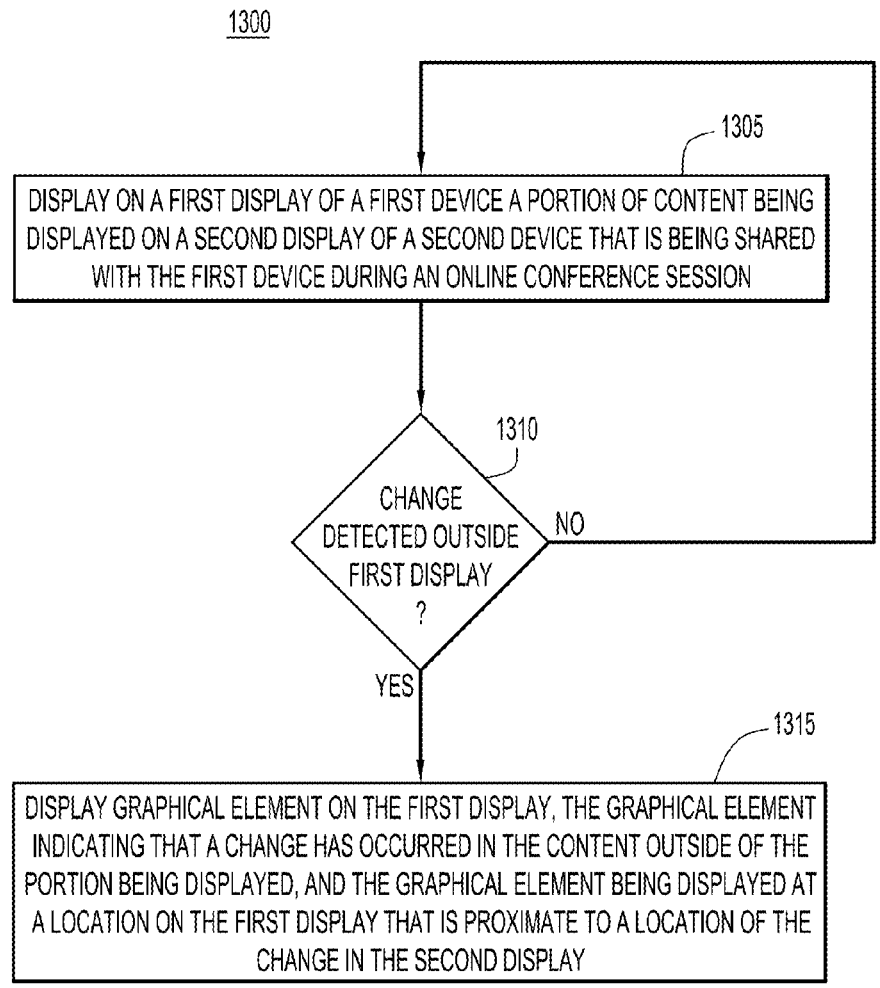
FIG. 13 is a flow chart depicting operations performed at the first device in according with the techniques presented herein.

FIG. 13 shows a flow chart depicting the operations of a process 1300 performed in a device according to the techniques presented herein. In this flow chart, a first device refers to a device that has a display not large enough to display all of the content being presented from and displayed on a second device, e.g., during an online collaboration/conference session. At step 1305, on a first display of a first device a portion of content being displayed on a second display of a second device that is being shared with the first device during an online conference session. At step 1310, it is determined whether a change has been made outside the first display. If not, the method returns to step 1305. If a change has been made outside the first display, the method proceeds to step 1315, which displays a graphical element on the first display, the graphical element indicating that a change has occurred in the content outside of the portion being displayed, and the graphical element being displayed at a location on the first display that is proximate to a location of the change in the second display. The various examples of change notifications, changed point indicators, etc., presented above in connection with FIGS. 3-12 may be employed as part of the process depicted in FIG. 13.

Figure 14:
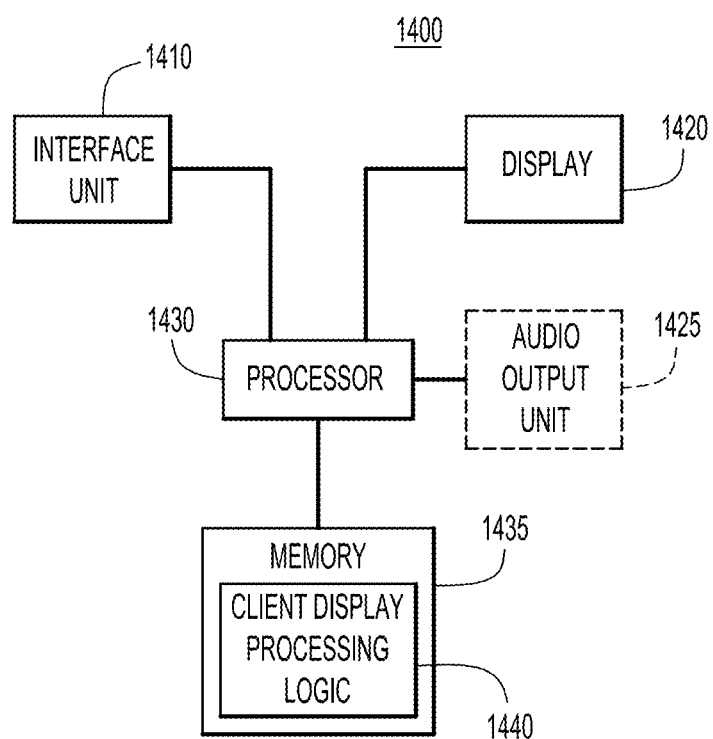
FIG. 14 is an example of a block diagram of the first device configured to perform the adaptive content display techniques presented herein.

Turning now to FIG. 14, a block diagram is shown of a device 1400 configured to perform the display techniques described herein. The device 1400 may be a mobile/cellular phone, but which may also include a desktop computer, laptop computer, tablet computer, etc. The device 1400 includes a network interface unit 1410, a display 1420, a processor 1430 and memory 1435. An audio output unit 1425 may also be provided, e.g., in the form of a sound card and a speaker, to present audio content to a user. The network interface unit 1410 enables network communications to allow the device to send and receive data over a network (wired and/or wireless) in order to participate in a collaboration/meeting session. The display 1420 may be any display device suitable for use in what may be a smaller hand-held type of device. The processor 1430 is, for example, a microprocessor or microcontroller that executes instructions for the client display processing logic 1440 stored in memory 1435.

Memory 1435 may comprise read only memory (ROM), random access memory (RAM), magnetic disk storage media devices, optical storage media devices, flash memory devices, electrical, optical, or other physical/tangible memory storage devices. The client processing logic 1440 may contain instructions implementing any embodiment of this invention. Thus, in general, the memory 1435 may comprise one or more tangible (non-transitory) computer readable storage media (e.g., a memory device) encoded with software comprising computer executable instructions and when the software is executed (by the processor 1430) it is operable to perform the operations described herein, interface unit 1410, display 1420, and/or audio output unit 1425. The client processing logic 1440 which contains instructions for execution of the present invention may be executed on the client device 1400 as shown, but may also be executed on meeting server 118, presenter device 110, or via cloud computing on network 148.

In method form, an embodiment of the invention comprises displaying on a first display of a first device a portion of content being displayed on a second display of a second device that is being shared with the first device during an online conference session. The method also comprises detecting when a first change has occurred in the content that is outside of the portion displayed on the first display. The method also comprises displaying, in response to detecting that the first change has occurred in the content that is outside of the portion displayed on the first display, a graphical element on the first display, the graphical element indicating that the first change has occurred in the content outside of the portion being displayed, and the graphical element being displayed at a location on the first display that is proximate to a location of the first change in content being displayed on the second display.

An embodiment of the invention in the form of a computer-readable storage media comprises computer executable instructions, and when the software is executed operable to generate for display on a first display of a first device a portion of content being displayed on a second display of a second device that is being shared with the first device during an online conference session. The software also detects when a first change has occurred in the content that is outside of the portion displayed on the first display. The software also generates for display, in response to detecting that the first change has occurred in the content that is outside of the portion displayed on the first display, a graphical element on the first display, the graphical element indicating that the first change has occurred in the content outside of the portion being displayed, and the graphical element being displayed at a location on the first display that is proximate to a location of the first change in the second display.

In apparatus form, an embodiment of the invention comprises a network interface configured to enable communications over a network, a memory configured to store client processing logic, and a processor coupled to the network interface and the memory. The processor is configured to generate for display on a first display of a first device a portion of content being displayed on a second display of a second device that is being shared with the first device during an online conference session. The process also detects when a first change has occurred in the content that is outside of the portion displayed on the first display. The process also generates for display, in response to detecting that the first change has occurred in the content that is outside of the portion displayed on the first display, a graphical element on the first display, the graphical element indicating that the first change has occurred in the content outside of the portion being displayed, and the graphical element being displayed at a location on the first display that is proximate to a location of the first change in the second display.

The above description is intended by way of example only.

What is claimed is:

1. A method comprising:
    displaying on a first display of a user device a portion of content being displayed on a second display of a presenter device that is sharing the content with the user device during an online conference session over a network;
    detecting when a first change has occurred in the content that is outside of the portion displayed on the first display; and
    displaying a graphical element on the first display in response to detecting that the first change has occurred in the content that is outside of the portion displayed on the first display, the graphical element including: a changed region notification comprising at least one notification bar displayed along a border of the first display that is closest to a region in which the first change has occurred; and a changed point indicator at a location in the at least one notification bar that is proximate to a location of the first change in content being displayed on the second display, the changed point indicator comprising at least one pointer, wherein a number of pointers in the changed point indicator is based on a number of changes associated with the changed point indicator.

2. The method of claim 1, wherein displaying the graphical element comprises:
    displaying the at least one notification bar as first and second notification bars at a corner of intersecting borders of the portion of the content displayed on the first display, such that the first notification bar and the second notification bar are displayed on each intersecting border, and
    displaying the changed point indicator at a location in either the first notification bar or the second notification bar that is proximate to a location of the first change in a corner region of the second display.

3. The method of claim 1, further comprising:
    detecting user selection of the changed point indicator; and
    displaying, in response to detecting user selection of the changed point indicator, on the user device content being displayed on the presenter device that contains the first change indicated by the changed point indicator.

4. The method of claim 3, further comprising:
    removing the changed point indicator and first notification bar when displaying, on the user device, content being displayed on the presenter device that contains the first change indicated by the changed point indicator.

5. The method of claim 1, further comprising:
    detecting a second change in the content being displayed on the second display outside of the portion displayed on the first display;
    detecting whether the second change is in substantially the same location as the first change;
    modifying the changed point indicator in response to detecting that the second change is in substantially the same location as the first change, such that the at least one pointer of the changed point indicator comprises at least two pointers; and
    displaying, in response to detecting that the second change is not substantially the same location as the first change, a second changed point indicator indicating that the second change has occurred in the content outside of the portion being displayed, and the second changed point indicator being displayed at a location in the at least one notification bar that is proximate to a location of the second change in content being displayed on the second display.

6. The method of claim 1, further comprising:
    removing from the first display, after a predetermined period of time has passed since the first change in content being displayed on the second display, the changed point indicator and the at least one notification bar.

7. The method of claim 1, wherein displaying the changed point indicator further comprises:
    determining a center point of the first display;
    determining an alignment point on the at least one bar that is linearly aligned with the location of the first change in the content being displayed on the second display and the center point of the first display; and
    displaying the changed point indicator on the alignment point.

8. One or more non-transitory computer readable storage media encoded with software comprising computer executable instructions and when the software is executed operable to:
  generate for display on a first display of a user device a portion of content being displayed on a second display of a presenter device that is being shared with the user device during an online conference session over a network;
  detect when a first change has occurred in the content that is outside of the portion displayed on the first display; and
  generate for display a graphical element on the first display in response to detecting that the first change has occurred in the content that is outside of the portion displayed on the first display, the graphical element including: a changed region notification comprising at least one notification bar displayed along a border of the first display that is closest to a region in which the first change has occurred; and a changed point indicator at a location in the at least one notification bar that is proximate to a location of the first change in the second display, the changed point indicator comprising at least one pointer, wherein a number of pointers in the changed point indicator is based on a number of changes associated with the changed point indicator.

9. The non-transitory computer readable storage media of claim 8, wherein instructions operable to generate for display the graphical element comprises instructions operable to generate for display: the at least one notification bar as first and second notification bars at a corner of intersecting borders of the portion of the content displayed on the first display, such that the first notification bar and the second notification bar are displayed on each intersecting border, and the changed point indicator at a location in either the first notification bar or the second notification bar that is proximate to a location of the first change in a corner region of the second display.

10. The non-transitory computer readable storage media of claim 8, further comprising instructions operable to:
  detect user selection of the changed point indicator; and
  generate for display, in response to detecting user selection of the changed point indicator, on the user device content being displayed on the presenter device that contains the first change indicated by the changed point indicator.

11. The non-transitory computer readable storage media of claim 8, further comprising instructions operable to:
  detect a second change in the content being displayed on the second display outside of the portion displayed on the first display;
  detect whether the second change is in substantially the same location as the first change;
  modify the changed point indicator in response to detecting that the second change is in substantially the same location as the first change, such that the at least one pointer of the changed point indicator comprises at least two pointers; and
  display, in response to detecting that the second change is not substantially the same location as the first change, a second changed point indicator indicating that the second change has occurred in the content outside of the portion being displayed, and the second changed point indicator being displayed at a location in the at least one notification bar that is proximate to a location of the second change in content being displayed on the second display.

12. The non-transitory computer readable storage media of claim 8, wherein instructions operable to display the changed point indicator further comprises instructions operable to:
  determine a center point of the first display;
  determine an alignment point on the at least one notification bar that is linearly aligned with the location of the first change in the content being displayed on the second display and the center point of the first display; and
  determine the changed point indicator on the alignment point.

13. An apparatus comprising:
  a network interface configured to enable communications over a network;
  a memory configured to store client processing logic;
  a processor coupled to the network interface and the memory, the processor configured to:
    generate for display on a first display of a user device a portion of content being displayed on a second display of a presenter device that is being shared with the user device during an online conference session over the network;
  detect when a first change has occurred in the content that is outside of the portion displayed on the first display; and
  generate for display a graphical element on the first display in response to detecting that the first change has occurred in the content that is outside of the portion displayed on the first display, the graphical element including: a changed region notification comprising at least one notification bar displayed along a border of the first display that is closest to a region in which the first change has occurred; and a changed point indicator at a location in the at least one notification bar that is proximate to a location of the first change in the second display, the changed point indicator comprising at least one pointer, wherein a number of pointers in the changed point indicator is based on a number of changes associated with the changed point indicator.

14. The apparatus of claim 13, wherein the processor is configured to generate for display the graphical element by generate for display: the at least one notification bar as first and second notification bars at a corner of intersecting borders of the portion of the content displayed on the first display, such that the first notification bar and the second notification bar are displayed on each intersecting border, and the changed point indicator at a location in either the first notification bar or the second notification bar that is proximate to a location of the first change in a corner region of the second display.

15. The apparatus of claim 13, wherein the processor is configured to:
  detect user selection of the changed point indicator; and
  generate for display, in response to detecting user selection of the changed point indicator, on the user device content being displayed on the presenter device that contains the first change indicated by the changed point indicator.

16. The apparatus of claim 13, wherein the processor is configured to:
  detect a second change in the content being displayed on the second display outside of the portion displayed on the first display;
  detect whether the second change is in substantially the same location as the first change;

modify the changed point indicator in response to detecting that the second change is in substantially the same location as the first change, such that the at least one pointer of the changed point indicator comprises at least two pointers; and display, in response to detecting that the second change is not substantially the same location as the first change, a second changed point indicator indicating that the second change has occurred in the content outside of the portion being displayed, and the second changed point indicator being displayed at a location in the at least one notification bar that is proximate to a location of the second change in content being displayed on the second display.

17. The apparatus of claim 13, wherein the processor is configured to generate for display the changed point indicator by:

determining a center point of the first display;

determining an alignment point on the at least one notification bar that is linearly aligned with the location of the first change in the content being displayed on the second display and the center point of the first display; and determining the changed point indicator on the alignment point.

* * * * *